United States Patent [19]

Shimura

[11] Patent Number: 4,746,978
[45] Date of Patent: May 24, 1988

[54] IMAGE SIGNAL QUANTIZING METHOD AND APPARATUS

[75] Inventor: Kazuo Shimura, Kanagawa, Japan

[73] Assignee: Fuji Photo Film Co., Ltd., Kanagawa, Japan

[21] Appl. No.: 15,473

[22] Filed: Feb. 17, 1987

[30] Foreign Application Priority Data

Feb. 14, 1986 [JP] Japan .................. 61-30195

[51] Int. Cl.$^4$ .............................................. H04N 7/01
[52] U.S. Cl. ..................................... 358/133; 358/260
[58] Field of Search ............... 358/133, 138, 140, 160, 358/260, 280

[56] References Cited

U.S. PATENT DOCUMENTS

| 4,542,411 | 9/1985 | Imanaka | 358/133 |
| 4,571,618 | 2/1986 | Hatori | 358/136 |
| 4,626,923 | 12/1986 | Yoshida | 358/283 |
| 4,633,325 | 12/1986 | Usubuchi | 358/133 |
| 4,661,839 | 4/1987 | Plantholt | 358/138 |
| 4,677,571 | 6/1987 | Riseman | 358/283 |
| 4,684,997 | 8/1987 | Romeo | 358/280 |

Primary Examiner—Howard W. Britton
Attorney, Agent, or Firm—Sughrue, Mion, Zinn, Macpeak, and Seas

[57] ABSTRACT

In a method of and apparatus for quantizing image signals, an image is divided into a plurality of minute unit regions in the course of quantization of image signals. The image signals in the respective minute unit regions are quantized by applying a plurality of such quantization characteristics that the numbers of levels after quantization are approximately equal to each other and positions of quantization steps are deviated from each other in the quantization width direction. The quantization characteristics are changed over for the respective minute unit regions.

12 Claims, 6 Drawing Sheets

F I G. 13
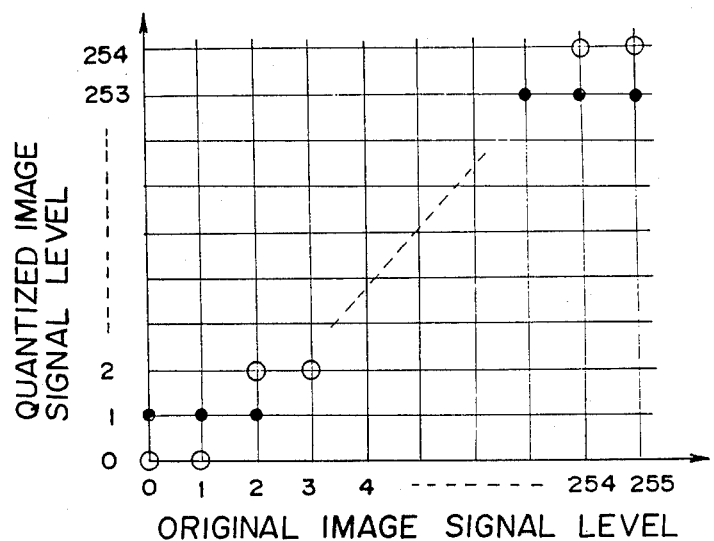
F I G. 14
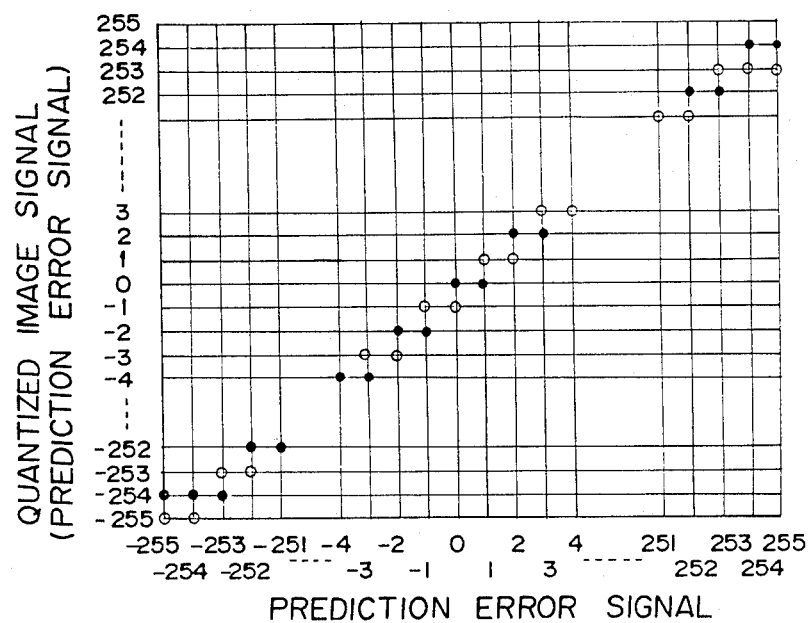

IMAGE SIGNAL QUANTIZING METHOD AND APPARATUS

BACKGROUND OF THE INVENTION

1. Field of the Invention

This invention relates to a method of quantizing image signals carrying gradation, and an apparatus for carrying out the method. This invention particularly relates to a method of quantizing image signals, which is suitable for the case where image signals are to be quantized coarsely, and an apparatus for carrying out the method.

2. Description of the Prior Art

In recent years, it has become a common practice to store image signals on a recording medium such as an optical disk, and read from the recording medium when necessary for reproducing a visible image on a cathode ray tube (CRT) or the like. It is also common to transmit image signals by facsimile or the like, and to reproduce a visible image on the signal receiving side based on the received image signals.

In the case where image signals are stored or transmitted, it is desirable that the amount of the image signals be decreased in advance. This is because, in the case of image signals carrying gradation, the amount of the image signals is generally very large, and the signal storage cost, the signal transmission cost, or the like becomes markedly high when the image signals are directly stored or transmitted.

As one of the methods for decreasing the amount of the image signals, there has heretofore been known a method of compressing the image signals by redundancy suppression encoding processing such as prediction encoding processing or encoding by orthogonal transformation. Besides, there may be used a method of decreasing the density resolution of the image signals, i.e. a method of making the quantization of the image signals coarse, or a method of combining the redundancy suppression encoding processing with the processing for decreasing the density resolution.

However, when the density resolution is decreased by making the quantization of the image signals coarse as mentioned above, an artifact such as an artificial contour readily arises in the reproduced visible image, though it is possible to decrease the amount of the image signals.

SUMMARY OF THE INVENTION

The primary object of the present invention is to provide a method of quantizing image signals, which is free from generation of an artifact even though the quantization is made coarse.

Another object of the present invention is to provide an apparatus for carrying out the method.

The present invention provides a method of quantizing image signals, which comprises the steps of:

(i) dividing an image into a plurality of minute unit regions in the course of quantization of image signals, and (ii) quantizing the image signals in the respective minute unit regions by applying a plurality of such quantization characteristics that the numbers of levels after quantization are approximately equal to each other and positions of quantization steps are deviated from each other in the quantization width direction, said quantization characteristics being changed over between the respective minute unit regions.

The method of the present invention is carried out by an apparatus for quantizing image signals, which comprises:

(i) a plurality of quantizers exhibiting such quantization characteristics that the numbers of levels after quantization are approximately equal to each other and positions of quantization steps are deviated from each other in the quantization width direction, (ii) a quantization change-over device for changing over the input of the image signals to each of said quantizers, and (iii) a controller for controlling the change-over operation of said quantization change-over device.

Specifically, in the present invention, in the course of quantizing image signals with a predetermined number of levels, instead of quantizing the whole image uniformly, a plurality of (e.g. two) quantization characteristics that result in the numbers of levels after quantization being approximately equal to each other and positions of quantization steps being deviated from each other in the quantization width direction are determined, and the image is divided into a plurality of minute unit regions, for example, into a lurality of regions in a unit of a single scanning line. The image signals in the respective minute unit regions are quantized by changing over the quantization characteristics for each of the minute unit regions. For example, quantization characteristics A and B are determined, and quantization is conducted by sequentially changing over the quantization characteristics A and B so that the image signal or image signals in one minute unit region are quantized based on the quantization characteristics A, the image signal or image signals in the minute unit region adjacent to said minute unit region are quantized based on the quantization characteristics B, and the image signal or image signals in the minute unit region adjacent to said adjacent minute unit region are quantized based on the quantization characteristics A. In this manner, it is possible to apparently provide the image with a density resolution several times the density resolution (number of levels) of the respective quantization characteristics on the basis of the visual integration effect of the human observer, thereby to restrict the generation of an artifact.

FIG. 2 shows the quantization characteristics A, FIG. 3 shows the quantization characteristics B, and FIG. 4 shows the quantization characteristics A and B together. For example, in the case where original image signals of eight bits and 256 levels are to be coarsely quantized to seven bits and 128 levels, when the whole image is quantized uniformly, based on, for example, only the quantization characteristics A indicated by black dots in FIG. 4, the difference in density between the image signals at adjacent levels naturally having not so large difference in density therebetween becomes doubled after quantization. For example, the image signals at a level 3 and at a level 4 become image signals at a level 2 and at a level 4. As a result, an artificial contour like a contour line readily arises. However, as shown in FIG. 4, when a plurality of the quantization characteristics wherein the positions of the quantization steps are deviated from each other in the quantization width direction are used in accordance with the present invention, though the original image signal levels 3 and 4 become the levels 2 and 4 as mentioned above under the quantization characteristics A indicated by the black dots, both the original image signal levels 3 and 4 become the level 3 and the difference in density therebetween disappears under the quantization characteristics B as indicated by the white dots. Therefore, when an image is divided into many minute unit regions and quantization is conducted by changing over the different quantization characteristics A and B for the respective minute unit regions, the regions having a large difference in density and the regions having no large difference in density are dispersed and positioned alternately. As a result, by the visual integration effect of the human observer, it becomes possible to obtain an image apparently having a density resolution higher than the actual density resolution (the actual number of levels), and to restrict the generation of an artificial contour.

Accordingly, with the method of and apparatus for quantizing image signals in accordance with the present invention, it is possible to decrease the amount of the image signals by coarse quantization, and to restrict the generation of an artificial contour which may be caused by conventional methods of coarse quantization.

BRIEF DESCRIPTION OF THE DRAWINGS

FIGS. 7 to 13 are conceptual views showing different examples of combinations of quantization characteristics that result in the numbers of levels after quantization being approximately equal to each other and positions of quantization steps being deviated from each other in the quantization width direction, FIG. 14 is a conceptual view showing examples of the quantization characteristics for prediction errors in the case of combination with prediction encoding processing.

DESCRIPTION OF THE PREFERRED EMBODIMENTS

The present invention will hereinbelow be described in further detail with reference to the accompanying drawings.

Figures 1, 5, 6:
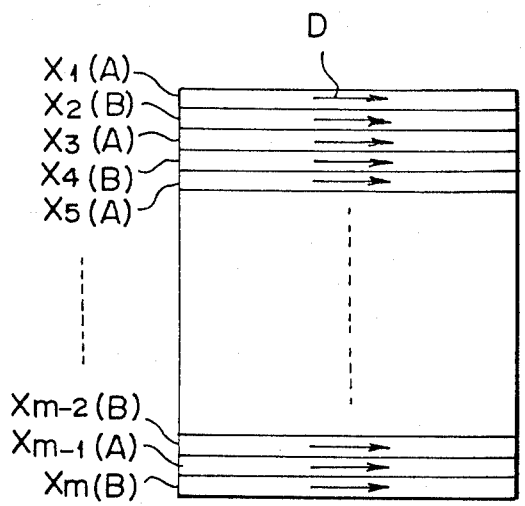
FIG. 1 is a conceptual view showing an example of division of an image into minute unit regions.
FIGS. 5 and 6 are conceptual views showing different examples of division of an image into minute unit regions.

An embodiment of the method of quantizing image signals will hereinbelow be described for the case where gradation image signals expressed with eight bits and 256 levels and obtained by sequentially scanning an image in the direction as indicated by the arrow D as shown in FIG. 1 are coarsely quantized to seven bits and 128 levels.

First, the image is divided into many minute unit regions. In this embodiment, as shown in FIG. 1, the region of a single scanning line is employed as the minute unit region, and the image is divided into scanning line regions X1, X2, X3, X4, ..., Xm−2, Xm−1, Xm. Then, the image signals at picture elements in each scanning line region are quantized by applying two different quantization characteristics, i.e. two quantization characteristics that result in the numbers of levels after quantization being equal to each other, i.e. both being 128 levels, and positions of quantization steps being deviated from each other in the quantization width direction, and changing over the two different quantization characteristics for the respective scanning line regions.

Specifically, in the case where quantization characteristics A and B are used as the aforesaid two different quantization characteristics, the image signals at the picture elements in the respective scanning line regions are quantized based on the quantization characteristics A and B by alternately changing over the different quantization characteristics A and B for the respective scanning line regions such that the quantization characteristics A are applied to the first scanning line region X1, the quantization characteristics B are applied to the second scanning line region X2, the quantization characteristics A are applied to the third scanning line region X3, the quantization characteristics B are applied to the fourth scanning line region X4, and so on. Stated differently, the image signals in the divided scanning line regions are quantized so that the image signals in the scanning line regions adjacent to each other are quantized based on the different quantization characteristics A and B.

Figure 2:
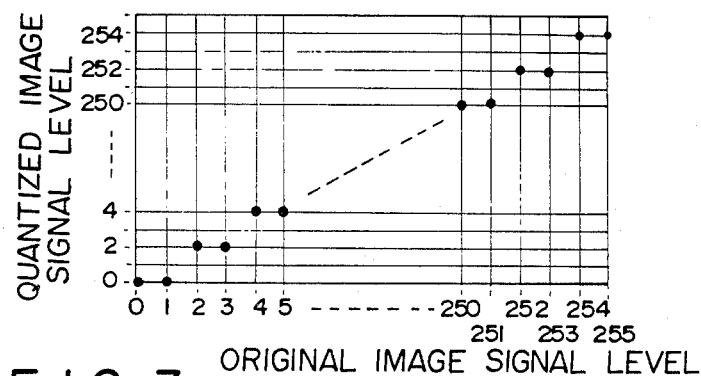
FIG. 2 is a conceptual view showing one of two such quantization characteristics that the numbers of levels after quantization are approximately equal to each other and positions of quantization steps are deviated from each other in the quantization width direction.
Figure 3:
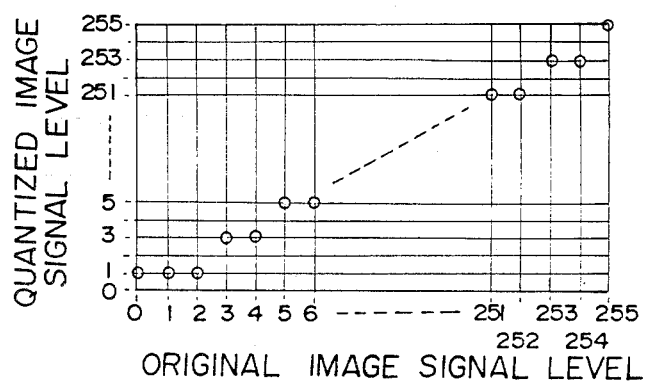
FIG. 3 is a conceptual view showing the other of the two quantization characteristics.

As mentioned above, the aforesaid different quantization characteristics A and B are such that the numbers of levels after quantization are equal to each other, and positions of quantization steps are deviated from each other in the quantization width direction. In this embodiment, the quantization characteristics as shown in FIG. 2 are employed as the quantization characteristics A, and the quantization characteristics as shown in FIG. 3 are used as the quantization characteristics B. With the quantization characteristics A as shown in FIG. 2, the original image signals of 256 levels are quantized to image signals of 128 levels. Specifically, two levels of the original image signals are rendered one level such that levels 0 and 1 of the original image signals are rendered the level 0, levels 2 and 3 are rendered the level 2, and levels 4 and 5 are rendered the level 4. Also with the quantization characteristics B as shown in FIG. 3, the original image signals of 256 levels are quantized to image signals of 128 levels. Specifically, two levels of the original image signals are rendered one level such that levels 0, 1 and 2 of the original image signals are rendered the level 1, levels 3 and 4 are rendered the level 3, and levels 5 and 6 are rendered the level 5 (in this case, at the original image signal regions of levels 0, 1 and 2, and the level 255, three levels and a single level are respectively rendered one level after quantization for reasons of processing of terminal signals). Also, the positions of the quantization steps of the quantization characteristics B are deviated from the positions of the quantization steps of the quantization characteristics A in the quantization width direction.

Specifically, black dots in FIG. 2 and white dots in FIG. 3 indicate the relationship between the original image signals and the quantized image signals. In FIGS.

Figure 4:
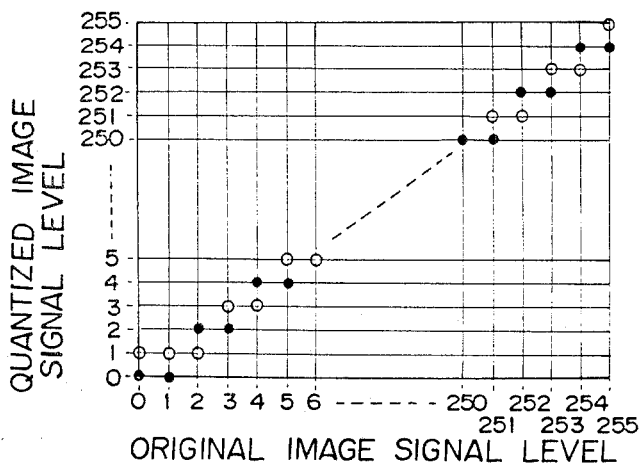
FIG. 4 is a conceptual view showing the two quantization characteristics together.

2 and 3, lines connecting the black dots or the white dots which become the same level after quantization are defined as the quantization step. That is, in FIG. 2, the line connecting the black dots at the levels 0 and 1 of the original image signals, the line connecting the black dots at the levels 2 and 3, the line connecting the black dots at the levels 4 and 5, and so on are defined as the quantization steps. In FIG. 3, the line connecting the white dots at the levels 0, 1 and 2 of the original image signals, the line connecting the white dots at the levels 3 and 4, the line connecting the white dots at the levels 5 and 6, and so on are defined as the quantization steps. Also, the width of the quantization step, i.e. the size of the range of the original image signals which are rendered a single level after quantization, is defined as the quantization width. In this case, as shown in FIG. 4, the quantization steps of the quantization characteristics A and the quantization steps of the quantization characteristics B are deviated from each other by one half of the quantization width in the quantization width direction, i.e. in the horizontal axis direction representing the original image signals in FIGS. 2 and 3.

Though the region of a single scanning line is employed as the minute unit region in the course of image division in the aforesaid embodiment, the minute unit region may also be a region composed of two scanning lines, a region composed of a single picture element, a region composed of 2×2 picture elements, a region composed of 3×3 picture elements, or the like. However, when the minute unit region is too large, the human observer cannot substantially perceive the visual integration effect. Therefore, the minute unit region must be adjusted suitably for obtaining the visual integration effect.

FIG. 5 shows an example of application of the quantization characteristics A and B in the case where the region composed of a single picture element is employed as the minute unit region. In FIG. 5, a single cell indicates the region of a single picture element. In this case, the quantization characteristics A and B are changed over for each of the adjacent picture element regions.

FIG. 6 shows an example of application of the quantization characteristics A and B in the case where the region composed of 2×2 picture elements is employed as the minute unit region. In this case, the same quantization characteristics are applied to the picture elements in a single region composed of 2×2 picture elements, and the quantization characteristics A and B are changed over between the adjacent 2×2 picture element regions.

As the plurality of such quantization characteristics that the numbers of levels after quantization are approximately equal to each other and positions of quantization steps are deviated from each other in the quantization width direction, besides the quantization characteristics A and B employed in the aforesaid embodiment as shown in FIG. 4, it is also possible to employ a plurality of quantization characteristics as shown in FIGS. 7 to 12.

Figure 7:
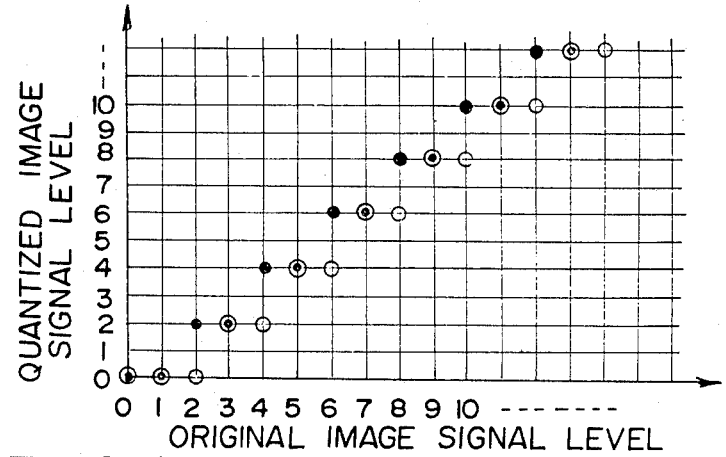

FIG. 7 shows a combination of quantization characteristics A as indicated by black dots with quantization characteristics B as indicated by white dots. In the quantization characteristics A and B as shown in FIG. 7, the position of the quantization steps are deviated only in the quantization width direction, though the positions of the quantization steps of the quantization characteristics A and B in FIG. 4 are deviated both in the quantization width direction and in the direction (vertical axis direction) normal to the quantization width direction.

Figure 8:
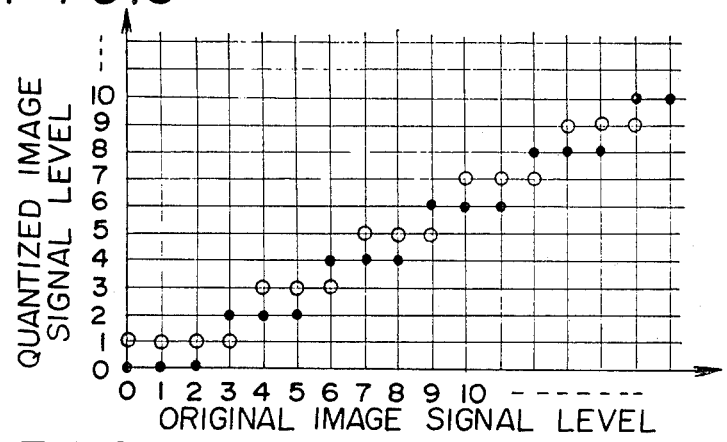

FIG. 8 shows a combination of quantization characteristics A as indicated by black dots with quantization characteristics B as indicated by white dots. In the quantization characteristics A and B as shown in FIG. 8, the quantization widths are of three levels, though the quantization widths of the quantization characteristics A and B in FIG. 4 are of two levels. In the case of FIG. 8, the number of levels of the image signals after quantization is decreased to one third of the number of levels of the original image signals.

Figure 9:
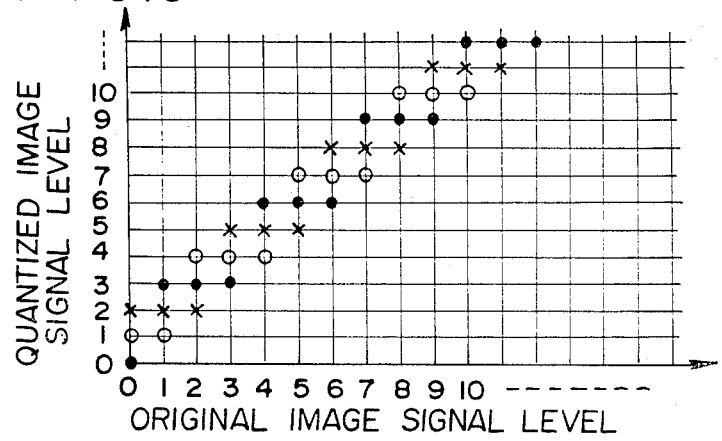

FIG. 9 shows a combination of quantization characteristics A, B and C respectively indicated by black dots, white dots, and "x" marks. As in the case of the two different quantization characteristics shown in FIG. 4, the quantization characteristics A, B and C as shown in FIG. 9 are such that the numbers of levels after quantization are approximately equal to each other and positions of quantization steps are deviated from each other in the quantization width direction. In the case where three quantization characteristics are used as shown in FIG. 9, they may be sequentially changed over between adjacent scanning line regions such that, for example, for the scanning line regions X1, X2, ..., Xm in FIG. 1, the quantization characteristics A are applied to the scanning line region X1, the quantization characteristics B are applied to the scanning line region X2, the quantization characteristics C are applied to the scanning line region X3, the quantization characteristics A are applied to the scanning line region X4, the quantization characteristics B are applied to the scanning line region X5, and so on.

Figure 10:
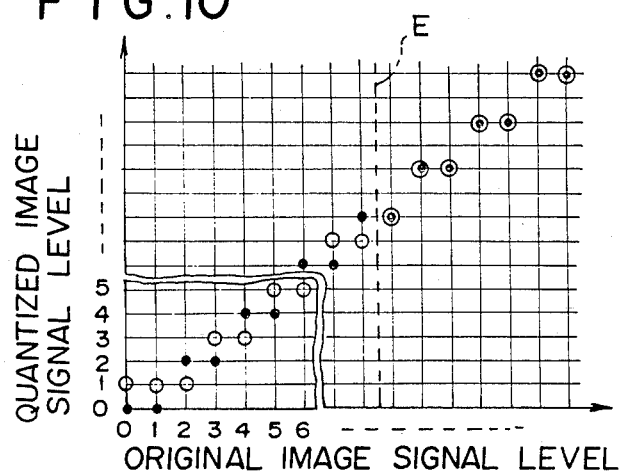

FIG. 10 shows a combination of quantization characteristics A as indicated by black dots with quantization characteristics B as indicated by white dots. The quantization characteristics A and B as shown in FIG. 10 are the same as shown in FIG. 4 at the region of low original image signal levels, and become identical with each other at the region (high density region) of levels higher than a level of the original image signal level, i.e. higher than the broken line E in FIG. 10. The visual characteristics of a human observer are such that an artifact caused by coarse quantization is imperceptible at the high density region of an image. Therefore, in the high density region, it is not absolutely necessary for the quantization steps to be deviated from each other.

Figure 11:
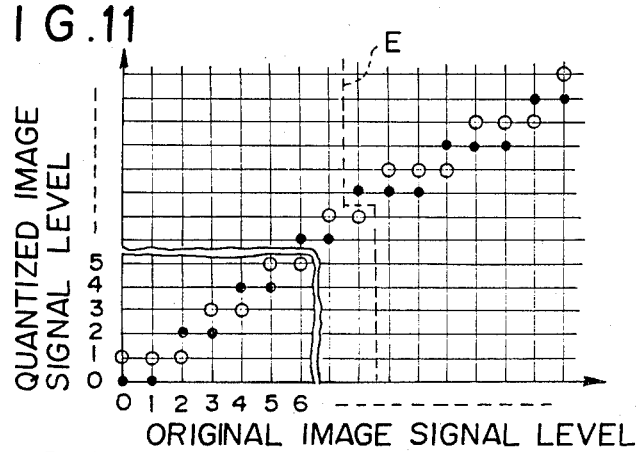

FIG. 11 shows a combination of quantization characteristics A as indicated by black dots with quantization characteristics B as indicated by white dots. The quantization characteristics A and B as shown in FIG. 11 are the same as shown in FIG. 4 at the region of low original image signal levels, and the quantization widths are increased from two levels to three levels at the region of levels higher than the broken line E. Also in this case, since an artifact does not readily appear at the high density region, the quantization is made coarse at the high density region.

Figure 12:
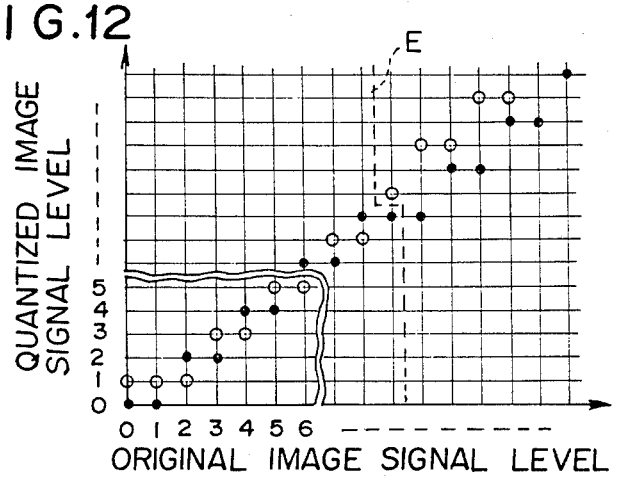

FIG. 12 shows a combination of quantization characteristics A as indicated by black dots with quantization characteristics B as indicated by white dots. In the quantization characteristics A and B as shown in FIG. 12, the direction of deviation of the step positions is reversed at the region of the broken line E. Specifically, on the left side of the broken line E, the step positions of the white dots are deviated rightwardly of the step positions of the black dots. On the right side of the broken line E, the step positions of the white dots are deviated leftwardly of the step positions of the black dots. This is because the human visual integration effect is obtained by deviating the step positions, and the step positions may be deviated in either direction. Also, as shown in FIG. 12, the two directions of deviation in step positions may be combined with each other.

FIG. 13 shows quantization characteristics which are approximately identical with those shown in FIG. 4, except for the end regions. Specifically, the number of levels after quantization with the quantization characteristics indicated by the black dots is smaller by one than the number of levels after quantization with the quantization characteristics indicated by the white dots. Thus the numbers of levels after quantization are not exactly equal to each other between the quantization characteristics indicated by the black dots and the quantization characteristics indicated by the white dots. The numbers of levels after quantization need not necessarily be exactly equal to each other by the processing of the end regions.

As will be understood from the aforesaid embodiments, a plurality of the quantization characteristics usable in the present invention merely have to satisfy the requirement that the numbers of levels after quantization are approximately equal to each other and positions of quantization steps are deviated from each other in the quantization width direction. The number of the quantization characteristics and the size of the quantization width may be adjusted to various values. Also, it is not absolutely necessary that the requirement be satisfied over the entire region of the characteristics as in the cases of FIGS. 10 and 11, and it suffices if it is satisfied at a part of the region of the characteristics.

The method of quantizing image signals in accordance with the present invention has the effects of making the quantization coarse and decreasing the amount of the image signals. However, the method may be also be combined with the aforesaid redundancy suppression encoding processing, thereby markedly decreasing the amount of the image signals. In this case, the quantization in accordance with the present invention may be conducted before the redundancy suppression encoding processing, in the course of the redundancy suppression encoding processing, or before and in the course of the redundancy suppression encoding processing.

In prediction encoding processing which is one type of the redundancy suppression encoding processing, the image signal at each picture element is predicted based on the image signal at a picture element in the vicinity of said picture element, and the difference (prediction error) between the predicted image signal value and the actual image signal value at the picture element is calculated. The prediction errors thus calculated are distributed mainly near zero. The image signals may be compressed by encoding the respective prediction errors into variable length codes such as Huffman codes by utilizing the aforesaid distribution characteristics of the prediction errors. In the case where the quantization in accordance with the present invention is conducted before the prediction encoding processing, prediction in the prediction encoding processing should preferably be carried out between the image signals quantized based on the same quantization characteristics. For example, in the case where the quantization characteristics are changed over for each of the regions composed of a single scanning line as shown in FIG. 1, prediction should preferably be carried out by one-dimensional prediction in each scanning line region. In the case where the quantization characteristics are changed over in the checkered pattern as shown in FIG. 5, prediction should preferably be carried out in the checkered pattern, i.e. previous value prediction should be conducted in the sequences as indicated by the solid line arrows and the broken line arrows in FIG. 5. In the case where the quantization characteristics are changed over for each of the 2×2 picture element regions as shown in FIG. 6, prediction should preferably be carried out along a zigzag line connecting the 2×2 picture element regions where the same quantization characteristics are applied.

In the case where the quantization in accordance with the present invention is conducted in the course of the prediction encoding processing, the quantization is conducted, for example, for the prediction errors calculated as mentioned above, and Huffman encoding is conducted for the quantized image signals. An example of the quantization characteristics used in such a case is shown in FIG. 14. The quantization characteristics shown in FIG. 14 are composed of a set of the quantization characteristics A and B as indicated by the black dots and the white dots as in the case of FIG. 4. Since the prediction errors have the plus and minus signs, they are of 511 levels from −255 to +255. With quantization characteristics B indicated by the white dots, the prediction errors are converted to a total of 255 levels alternately between −255 and +253. With the quantization characteristics A indicated by the black dots, the prediction errors are converted to a total of 255 levels alternately between −254 and +254. Also in this case, the image composed of prediction error signals is divided into minute unit regions, and the quantization characteristics A and B are changed over for each of the minute unit regions.

Figure 15:
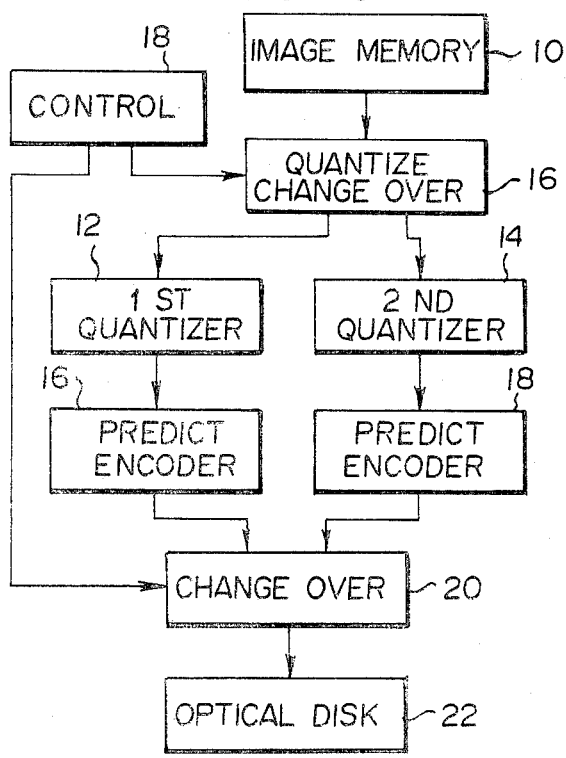
FIG. 15 is a block diagram showing an example of the image signal compressing system wherein an embodiment of the apparatus for quantizing image signals in accordance with the present invention is employed.

FIG. 15 is a block diagram showing an image signal compressing system wherein an embodiment of the quantizing apparatus for carrying out the method of the present invention is employed. The image signal compressing system is constituted so that the quantization in accordance with the present invention is conducted before the aforesaid prediction encoding processing.

The system shown in FIG. 15 comprises an image memory 10 storing the original image signals which are to be quantized, a first quantizer 12 for quantizing the image signals received from the memory 10 in accordance with one of two quantization characteristics that result in the numbers of levels after quantization being approximately equal to each other and positions of quantization steps being deviated from each other in the quantization width direction, for example, one of the quantization characteristics A and B as shown in FIG. 4, a second quantizer 14 for quantizing the image signals received from the memory 10 in accordance with the other of the two quantization characteristics, and a quantization change-over device 16 for changing over the input of the image signals from the image memory 10 to the quantizer 12 or the quantizer 14. The system also comprises a controller 18 for controlling the change-over operation of the quantization change-over device 16 so that, for example, the quantization is changed over between adjacent scanning lines, prediction encoders 16 and 18 which are of the same type and which compress the image signals by prediction encoding processing of the image signals quantized by the quantizers 12 and 14, and a change-over device 20 for changing over the input of the code signals from the prediction encoders 16 and 18 to an optical disk 22. The change-over operation of the change-over device 20 is controlled by the controller 18 so that it is synchronized with the change-over operation of the quantization change-over device 16.

Figure 16:
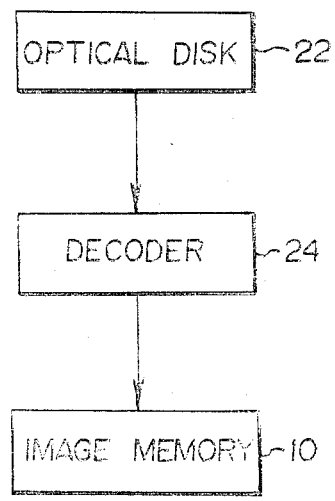
FIG. 16 is a block diagram showing an example of the image signal extending system for extending the image signals compressed by the system of FIG. 15.

FIG. 16 is a block diagram showing an example of an image signal extending system for reading the image signals, which are quantized and compressed by the system of FIG. 15 and stored on the optical disk 22, from the optical disk 22, decoding and extending the read image signals by a decoder 24, and feeding the image signals to the image memory 10. The decoder 24 conducts processing for returning the image signals compressed by the aforesaid prediction encoding processing to the form prior to the compression, i.e. to the form prior to the prediction encoding processing, or to a form corresponding thereto. For example, the decoder 24 conducts processing reverse to the prediction encoding processing.

Though the digital image signals already quantized are further quantized coarsely in the aforesaid embodiments, the present invention is applicable also to the cases where analog image signals are quantized.

The present invention is not limited to the aforesaid embodiments and may be modified in various manners.

I claim:

1. A method of quantizing image signals, which comprises the steps of:
   (i) dividing an image into a plurality of minute unit regions in the course of quantization of image signals, and
   (ii) quantizing the image signals in the respective minute unit regions by applying a plurality of quantization characteristics that result the numbers of levels after quantization being approximately equal to each other and positions of quantization steps being deviated from each other in the quantization width direction, said quantization characteristics being changed over between the respective minute unit regions.

2. A method as defined in claim 1 wherein said plurality of the quantization characteristics are such that the numbers of levels after quantization are approximately equal to each other and positions of quantization steps are deviated from each other in the quantization width direction and in the direction normal to said quantization width direction.

3. A method as defined in claim 1 wherein said plurality of the quantization characteristics are such that they become identical with each other at a high density region of said image.

4. A method as defined in claim 1 wherein said plurality of the quantization characteristics are such that widths of said quantization steps are increased at a high density region of said image.

5. A method as defined in claim 1 wherein said plurality of the quantization characteristics are such that the direction of deviation of said positions of quantization steps is reversed at a high density region of said image.

6. A method as defined in claim 1 further comprising the step of redundancy suppression encoding processing.

7. A method as defined in claim 6 wherein the quantization is conducted before and in the course of the redundancy encoding processing.

8. A method as defined in claim 6 wherein the quantization is conducted before the redundancy suppression encoding processing.

9. A method as defined in claim 8 wherein said redundancy suppression encoding processing is prediction encoding processing, and prediction in the prediction encoding processing is carried out between the image signals quantized based on the same quantization characteristics.

10. A method as defined in claim 6 wherein the quantization is conducted in the course of the redundancy suppression encoding processing.

11. A method as defined in claim 10 wherein said redundancy encoding processing is prediction encoding processing, and the quantization is conducted for a prediction error calculated in the prediction encoding processing.

12. An apparatus for quantizing image signals, which comprises:
   (i) a plurality of quantizers exhibiting quantization characteristics that result in the numbers of levels after quantization being approximately equal to each other and positions of quantization steps being deviated from each other in the quantization width direction,
   (ii) a quantization change-over device for changing over the input of the image signals to each of said quantizers, and
   (iii) a controller for controlling the change-over operation of said quantization change-over device.

* * * * *